US011758049B1

United States Patent
Gentry et al.

(10) Patent No.: US 11,758,049 B1
(45) Date of Patent: Sep. 12, 2023

(54) TECHNIQUES FOR USING CALL METADATA AS AN INDICATOR FOR CALLING PARTY AUTHENTICITY

(71) Applicant: Bandwidth Inc., Raleigh, NC (US)

(72) Inventors: William Gentry, Raleigh, NC (US); Mark Greene, Holly Springs, NC (US); Elijah Tirrell Robertson, Fuquay Varina, NC (US); Alexander Weston Green, Raleigh, NC (US); Nayan Raj Jogithaya, Raleigh, NC (US)

(73) Assignee: Bandwidth Inc., Raleigh, NC (US)

( * ) Notice: Subject to any disclaimer, the term of this patent is extended or adjusted under 35 U.S.C. 154(b) by 0 days.

(21) Appl. No.: 18/133,614

(22) Filed: Apr. 12, 2023

Related U.S. Application Data

(60) Provisional application No. 63/442,894, filed on Feb. 2, 2023.

(51) Int. Cl.
*H04M 3/51* (2006.01)
*H04M 7/00* (2006.01)
*H04M 3/42* (2006.01)

(52) U.S. Cl.
CPC ..... *H04M 3/5191* (2013.01); *H04M 3/42059* (2013.01); *H04M 7/006* (2013.01)

(58) Field of Classification Search
CPC . H04M 3/5191; H04M 3/42059; H04M 7/006
See application file for complete search history.

(56) References Cited

U.S. PATENT DOCUMENTS

| | | | | |
|---|---|---|---|---|
| 7,519,353 B2 * | 4/2009 | Stevens | ................. | H04W 24/02 455/406 |
| 8,099,278 B2 * | 1/2012 | Witzman | ................ | G10L 15/26 704/250 |
| 8,238,532 B1 * | 8/2012 | Cox | ...................... | H04M 15/47 379/144.03 |
| 9,930,186 B2 * | 3/2018 | Bandyopadhyay | ... | H04W 12/12 |
| 10,146,919 B1 * | 12/2018 | Osborne | ................ | H04M 15/63 |
| 10,362,172 B2 * | 7/2019 | Strong | ................. | H04M 3/493 |

(Continued)

*Primary Examiner* — Lisa Hashem
(74) *Attorney, Agent, or Firm* — Gregory Stephens

(57) ABSTRACT

Techniques are disclosed to determine one or more specific data points that may be found in or added to call metadata that will assist and/or enhance confidence score algorithms. A call request for an inbound VoIP telephony call may be received by a telephony server in a servicing telecommunications carrier network. The call request may be intended for a called party serviced by the servicing telecommunications carrier network. The servicing telecommunications carrier network telephony server may obtain a plurality of data points associated with the call request wherein at least one of the data points is an interconnect carrier, the interconnect carrier data point identifying which carrier handed the call to the servicing carrier. The servicing telecommunications carrier network telephony server may then send the plurality of data points to a confidence score generating process comprising an algorithm configured to determine a confidence score using the data points. The servicing carrier telephony server may then receive the confidence score from the confidence score generating process and pass the confidence score to the called party.

28 Claims, 6 Drawing Sheets

(56) References Cited

U.S. PATENT DOCUMENTS

| | | | |
|---|---|---|---|
| 11,323,563 B1* | 5/2022 | Rao | H04L 61/2503 |
| 11,403,596 B2* | 8/2022 | Jawale | G06Q 10/105 |
| 11,425,251 B2* | 8/2022 | Konig | G06Q 30/01 |
| 11,611,652 B2* | 3/2023 | Merchant | H04M 3/42059 |
| 2005/0216550 A1* | 9/2005 | Paseman | H04L 51/52 |
| | | | 709/202 |
| 2007/0274286 A1* | 11/2007 | Krishnan | H04L 45/00 |
| | | | 370/351 |
| 2008/0084975 A1* | 4/2008 | Schwartz | H04M 3/436 |
| | | | 379/88.22 |
| 2008/0208589 A1* | 8/2008 | Cross | H04N 21/41407 |
| | | | 348/E7.071 |
| 2013/0036458 A1* | 2/2013 | Liberman | G06F 21/32 |
| | | | 726/5 |
| 2013/0060695 A1* | 3/2013 | Davis | G06Q 20/384 |
| | | | 705/44 |
| 2022/0148568 A1* | 5/2022 | Kulkarni | G10L 15/26 |

* cited by examiner

100

300

400

500

TECHNIQUES FOR USING CALL METADATA AS AN INDICATOR FOR CALLING PARTY AUTHENTICITY

CROSS-REFERENCE TO RELATED APPLICATIONS

This application is related to and claims the benefit of U.S. Provisional Patent Application 63/442,894 filed on Feb. 2, 2023.

BACKGROUND

Enterprise telephony customers encourage or solicit their customers to contact them via telephone calls (e.g., toll-free calling) to discuss a wide variety of matters that may be broadly characterized as customer service. These calls often require the enterprise (called party) to validate or authenticate the calling party before certain topics may be discussed or actions taken. Validating a caller may include having the caller provide certain data known only to the caller. The degree to which the caller must prove who they are may also be influenced by the technical aspects of the phone call itself.

Enterprise telephony customers obtain telephony service from telecommunications carrier networks or more simply carriers. For example, an enterprise customer's servicing carrier my receive inbound VoIP telephony calls for the enterprise and has access to a plethora of call metadata and other network type data associated with each inbound VoIP telephony call. Some of this call metadata may be useful in determining the authenticity of the calling party.

There are tools and services that claim to be able to provide confidence scores as to the authenticity of the calling party based on algorithms run on a variety of data points including call metadata. The providers of such services may obtain and/or have access to current and historical call metadata that may be used to identify patterns, characteristics, or features of authentic calls. These service providers create scoring algorithms to process these data points to determine a confidence score indicative of the authenticity of a current inbound VoIP telephony call. For example, the scoring algorithm may process call metadata (and perhaps other relevant data) in real-time to determine a confidence score of 78. For the sake of discussion, a normalized scale of 0-100 may be used for the scoring system. Further assume that a higher confidence score is indicative of a more authentic call than a lower score.

It should be noted that a numerical system is but one scale for representing a confidence score. Other scales such as, including but not limited to, color coding (e.g., red, yellow, green) or letter grading (e.g., A-F) may also be employed.

Once a confidence score has been obtained by the servicing telecommunications carrier network, it may be forwarded to the enterprise customer's telephony platform. In one embodiment, the process of obtaining and forwarding the confidence score to the enterprise customer's telephony platform is performed in parallel with the actual call processing meaning the inbound call itself is processed normally and the confidence score is obtained and forwarded to the enterprise customer's telephony platform upon request (e.g., API request). In another embodiment, the servicing telecommunications carrier network can briefly hold the inbound call request while the confidence score is obtained. Then, the call request may have the confidence score embedded therein and forwarded to the enterprise customer's telephony platform. So long as the confidence score may be determined in a very short period of time there will be no appreciable delay noticed by the calling party.

Once the enterprise customer's telephony platform receives the confidence score, they are free to act on it as they see fit.

DETAILED DESCRIPTION

Figure 1:
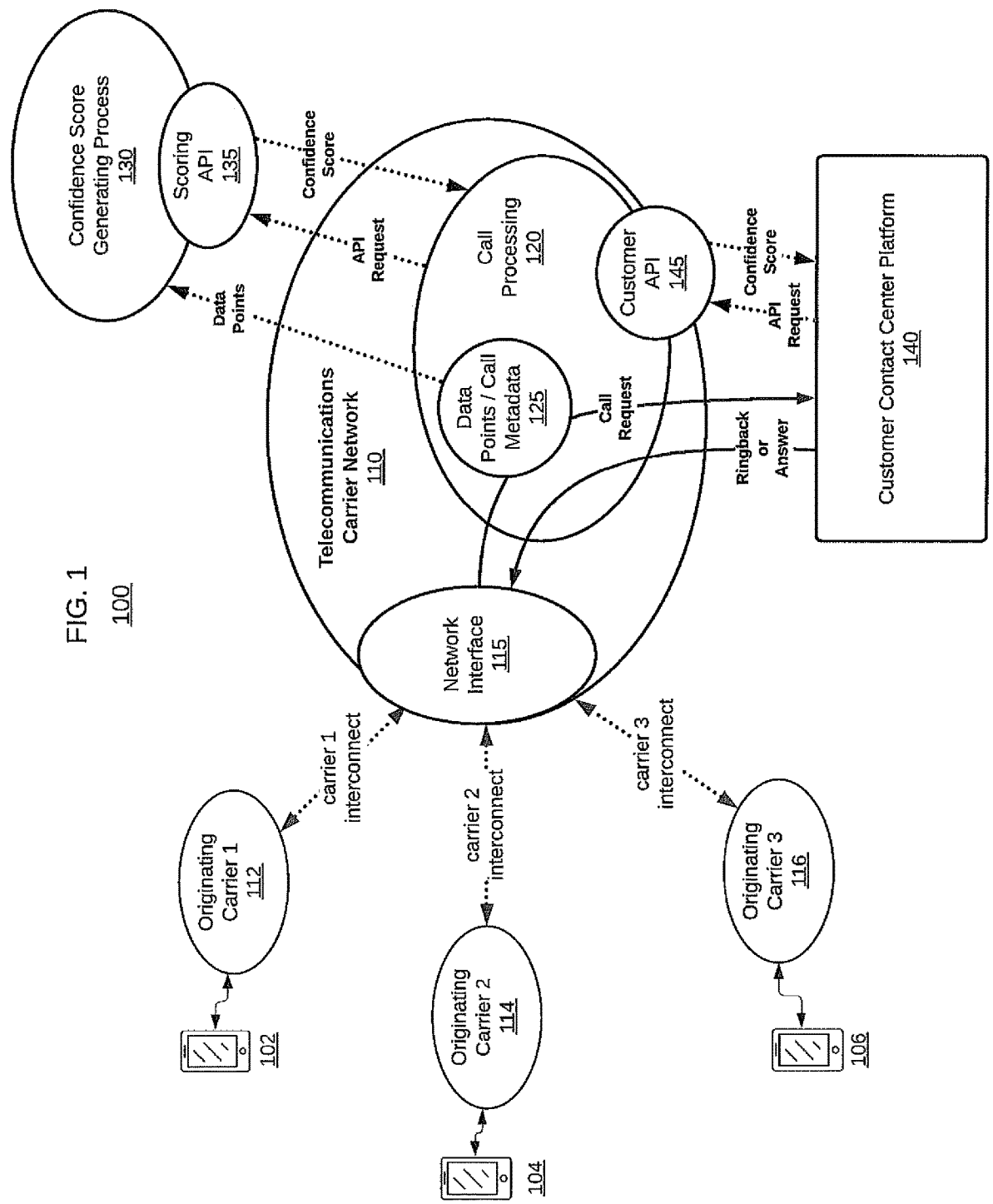
FIG. 1 illustrates a network diagram describing aspects of certain embodiments disclosed herein.

The inventive concept now will be described more fully hereinafter with reference to the accompanying drawings, in which illustrative embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. Like numbers refer to like elements throughout. As used herein, the term "and/or" includes any and all combinations of one or more of the associated listed items. Similarly, as used herein, the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Reference will now be made in detail in various and alternative example embodiments and to the accompanying figures. Each example embodiment is provided by way of explanation, and not as a limitation. It will be apparent to those skilled in the art that modifications and variations can be made without departing from the scope or spirit of the disclosure and claims. For instance, features illustrated or described as part of one embodiment may be used in connection with another embodiment to yield a still further embodiment. Thus, it is intended that the present disclosure includes modifications and variations that come within the scope of the appended claims and their equivalents.

As will be discussed further below with respect to the figures, various embodiments of the present inventive concept include systems, methods, apparatus, and/or computer program products that describe and claim techniques to deliver confidence scores for inbound telephony calls as generated by call scoring algorithms using call metadata and other data points.

When it comes to call scoring algorithms used by the confidence score generating processes, the more relevant data points that are considered, the more accurate and useful the resulting confidence score. For example, data points for the present call may be compared to data points from known previous authentic calls. The more the current call looks like a previous authentic call, the better. Factors such as, geographic location of the calling party may be one relevant indicator. Perhaps the calling party typically calls when at home or when at a particular office location. This data may be gleaned in the call metadata in originating IP addresses or other means. The originating carrier servicing the calling party provides certain call metadata in the call request. There may be many other factors that make up relevant data points and call metadata to be used by the scoring algorithm.

Consider the following example in which a financial services company (e.g., FSC) is the customer of a servicing telecommunications network carrier or servicing carrier. One service FSC may receive from its telephony carrier may be toll-free telephony service in which the servicing carrier provides one or more toll-free telephone numbers to FSC that are used to receive calls from the clients of FSC. The servicing carrier in this case is responsible for receiving and routing inbound calls to FSC's customer contact center platform. When a client calls FSC using one of the toll-free numbers, the call is ultimately routed to the servicing carrier. The servicing carrier may then route the call to FSC's customer contact center platform where it may be further routed internally and answered by an FSC customer service representative.

With respect to the inbound call, FSC may wish to have an idea as to the authenticity of the calling party. FSC will typically validate the calling party before providing any potentially sensitive information over the phone. If FSC has more confidence with respect to the authenticity of the calling party, then less burdensome validation procedures may be required during the call. This is where the confidence score comes into play. Suppose the carrier is able to dynamically run or have run the scoring algorithms on the current call and have a confidence score calculated. This confidence score may be passed to the customer (FSC). FSC may then employ intelligent internal routing of the call based on the confidence score. The agent speaking on behalf of FSC may then determine how much additional validation of the calling party is needed before getting to the substance of the call. Alternatively, an interactive voice response system (IVR) or other automated system may be employed to determine how much additional validation of the calling party is needed before getting to the substance of the call.

Hypothetically, and for exemplary purposes only, if the confidence score is 50 or below, the agent may require very stringent additional validation steps such as the recitation of a six digit PIN code, the response to one or more challenge questions, the last 4 digits of the account holder's SSN, etc. But if the confidence score is above 90, the agent may, for instance, only require the PIN code.

Inbound VoIP telephony call requests typically include the calling party's telephone number within the call request. This telephone number may be looked up to determine which carrier is responsible for providing service for that number. Referring back to the example, suppose a client of FSC is a customer of Carrier 1. That client's telephone number is associated with Carrier 1 and this information is available to other carriers. Many of the scoring algorithm service providers may also be able to access this information. There is, however, another data point that is not accessible to anyone but the servicing carrier for FSC. This data point may be referred to as the interconnect data point. The interconnect data point identifies the binding or interface the inbound VoIP telephony call arrived on when it hit the servicing carrier's network. This is relevant because the servicing carrier may have separate direct interconnects with a plurality of carriers. This additional data point can confirm if an inbound VoIP telephony call with a calling party telephone number associated with Carrier 1 arrived on the Carrier 1 interconnect. If it did not, then the call may be more suspect because the carrier associated with the calling party telephone number and the carrier associated with the interconnect are different. If they match, it may not guarantee validity because the calling party telephone number may have been spoofed from another customer of Carrier 1.

This data point can significantly impact the confidence score. The confidence score itself is determined in real-time and returned to the servicing carrier where it may be passed along to the customer (FSC) via an application programming interface (API) request in one embodiment or in the call request signaling if the score can be obtained prior to forwarding the call request to the customer. FSC may then determine an internal routing and enhanced security protocol based on the confidence score. Moreover, FSC may also determine a status of the inbound VoIP telephony caller when deciding how to route the call internally. Certain calling party telephone numbers may be associated with high value clients. For example, a high confidence score with an enhanced status indicator based on the perceived identity of the caller may result in the call being escalated to the front of a queue or even to a dedicated customer service representative thereby bypassing a normal call queue and potential wait times.

Referring to FIG. 1, a network architecture diagram 100 illustrating an environment suitable for carrying out embodiments of the invention is shown. FIG. 1 may be described from the perspective of the telecommunications carrier network 110 which may be owned and/or operated by a servicing carrier. For illustrative purposes, a customer enters into an agreement with the servicing carrier in which the servicing carrier provides toll-free telephone numbers and service to the customer. The customer may operate its own customer contact center platform 140 that is communicable with the telecommunications carrier network 110. All calls to the toll-free numbers are routed to the telecommunications carrier network 110 before ultimately being passed to the customer contact center platform 140.

Inbound VoIP telephony call requests may originate with the clients of the customer. In FIG. 1, the clients of the customer may be represented by the end user devices 102, 104, 106. In this example, each end user device is serviced by a different carrier—originating carrier-1 112, originating carrier-2, 114, and originating carrier-3 114. It should be noted that an end user device may be serviced by the telecommunications carrier network 110 such that calls originating from such an end user device are considered on-net because no other carriers are involved in the call routing. When, for instance, end user device 102 dials a toll-free number assigned to the customer, a call request is routed from end user device 102 to originating carrier-1 112 to a call processing server 120 server via a network interface 115 within telecommunications carrier network 110 to customer contact center platform 140. Customer contact center platform 140 may then act on the call request.

The call request may be in the form of a session initiation protocol (SIP) INVITE by the time it is processed by the call processing server 120 within the servicing carrier 110. There is call metadata 125 that may be included in the SIP INVITE itself (e.g., calling party telephone number, originating carrier, certain location information of the originating carrier and/or calling party device, etc.) and also other data points that may be created in the handling of the SIP INVITE by the telecommunications carrier network 110 (e.g., the specific interconnect on which the SIP INVITE arrived into the servicing carrier, the data center of ingress to the servicing carrier, on-net/off-net indicators, etc.). In addition, anonymized data indicating a customer associated with an on-net call may be included as call or other metadata. This anonymized data point may complement the on-net indicator to reflect that the call is originating from a specific customer account without revealing the identity of the customer. With this particular call metadata, a scoring algorithm can confirm that every inbound VoIP telephony call associated from a specific calling party number always comes from the same on-net customer interface.

Collectively, the call and other data points 125 may be used to assist in authenticating the calling party and/or the calling party device. Authenticating may be extremely important to the called party. The degree of confidence the customer (called party) has may influence how call gets handled within the called party's telephony network.

The totality of the call metadata and other data points 125 may be forwarded to a confidence score generating process 130 executing one or more algorithms on the data points to yield a confidence score. The confidence score may be an indicator as to the confidence that the calling party is who they purport to be. The confidence score generating process 130 may weight certain characteristics of the call metadata and other data points 125 and compare them against historical data of known authentic calls with similar call metadata and other data points 125 profiles. The confidence score generating process 130 may even be based in artificial intelligence (AI) and can be trained using vast numbers of prior call requests and associated call metadata and other data points 125.

When the customer contact center platform 140 receives the call request and answers the call, it may request via a customer API 145 with the telecommunications carrier network 110 the confidence score associated with the call request for the inbound VoIP telephony call. In turn, the telecommunications carrier network 110 via a scoring API 135 may request the confidence score from confidence score generating process 130. The confidence score generating process 130 returns the confidence score to telecommunications carrier network 110 which then returns the confidence score to customer contact center platform 140.

The logic flow and messaging diagrams herein may be representative of some or all of the operations executed by one or more logic, features, or devices described herein, such as any devices or systems described above with references to other figures herein. In the illustrated examples shown, the logic flowcharts may comprise one or more steps or processes involved in determining the characteristics of a called party as described elsewhere herein. The embodiments, however, are not limited to the number, type, order or arrangement of steps shown in any individual logic flow diagram.

Figure 2:
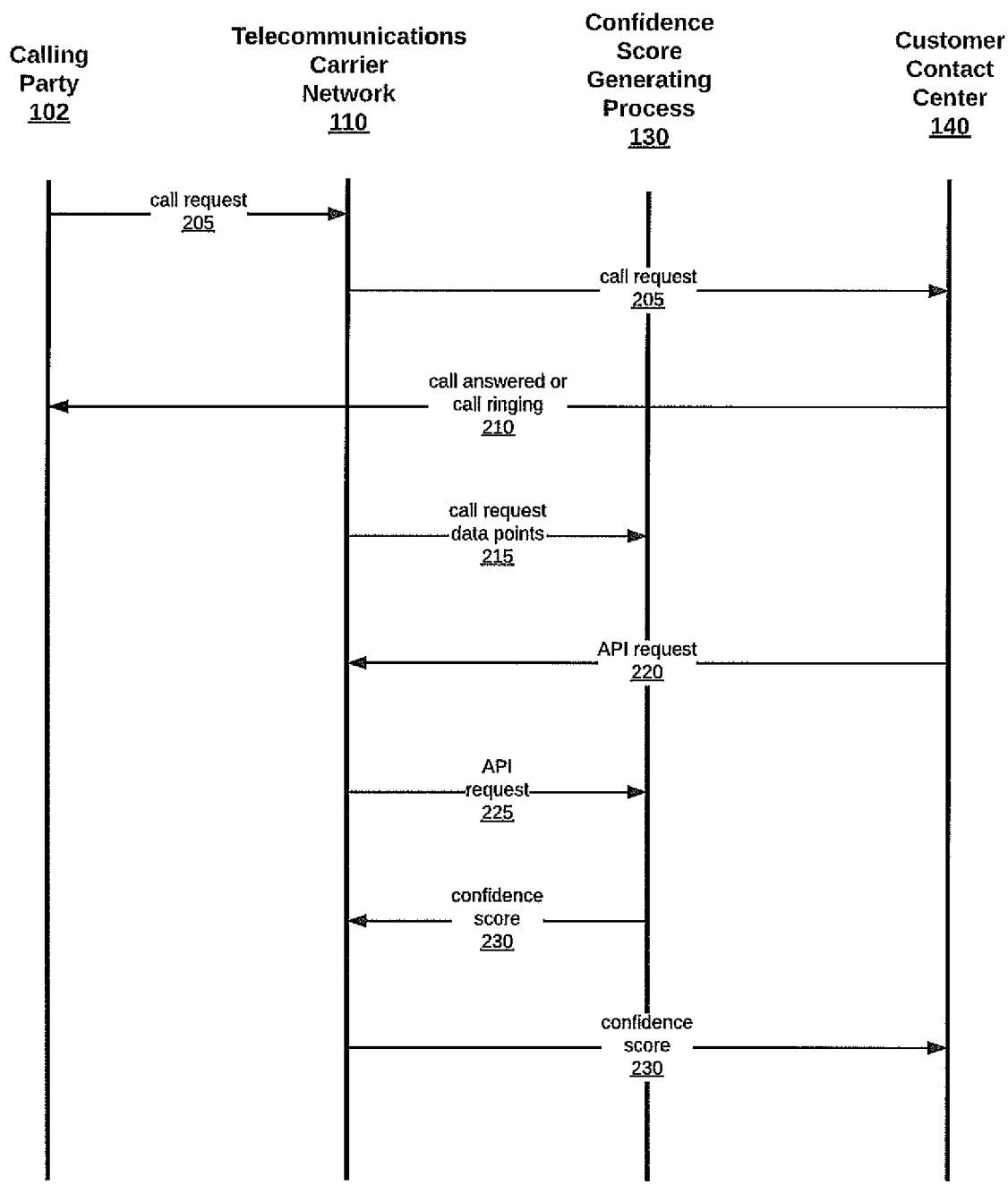
FIG. 2 illustrates a messaging diagram describing aspects of certain embodiments disclosed herein.

Referring to FIG. 2, a messaging diagram 200 describing the call flow signaling for processing an inbound VoIP telephony call to obtain and deliver a confidence score. A calling party 102 uses a telephony device to generate a call request to a customer contact center 140 by dialing a telephone number associated with the customer contact center 140. The call request 205 is routed to the telecommunications carrier network 110 that services the customer contact center 140. The call request 205 may traverse one or more intermediate carriers (not shown) before arriving at telecommunications carrier network 110 including the carrier that services the calling party 102. The telecommunications carrier network 110 receives the call request 205, determines the called party it is intended for, and routes it to the customer contact center 140. In this embodiment, the telecommunications carrier network 110 is a voice-over IP (VoIP) telephony network meaning the call request is either received as or has been converted to a session initiation protocol (SIP) invite message.

The customer contact center 140 then returns a call answered (e.g., SIP 200) or call ringing (e.g. SIP 18$x$) message 210 back to the calling party 102 by way of telecommunications carrier network 110. Telecommunications carrier network 110 has also determined that the called party telephone number is further associated with the confidence score feature and sends data points 215 (e.g., call metadata and other data) pertaining to the current call request to a confidence score generating process 130. The confidence score generating process 130 may be separate from but accessible to the telecommunications carrier network 110 via application programming interface (API) exchanges. The confidence score generating process 130 may also be contained within the telecommunications carrier network 110. In this example, the confidence score generating process 130 is separate from but accessible to the telecommunications carrier network 110.

Because the customer contact center 140 subscribes to the confidence score feature, it makes an API request 220 to the telecommunications carrier network 110 seeking a confidence score associated with the current call request 205. Receipt of API request 220 triggers a second API request 225 from telecommunications carrier network 110 to confidence score generating process 130 also seeking the confidence score for the current call request 205. The confidence score generating process 130 having processed the data points previously received to determine a confidence score for the current call request returns the confidence score 230 in response to API request 225 to telecommunications carrier network 110.

Telecommunications carrier network 110 in turn returns the confidence score 230 in response to API request 220 to customer contact center 140.

It should be noted that the embodiments described herein described the called party as a customer contact center. Most customer contact centers utilize toll-free calling for the benefit of their customers. However, the techniques described herein apply equally to other non customer contact center called parties that wish to receive a confidence score associated with the calling party. The use of a customer contact center represents but one significant use case for the techniques described but it is not limited thereto.

Figure 3:
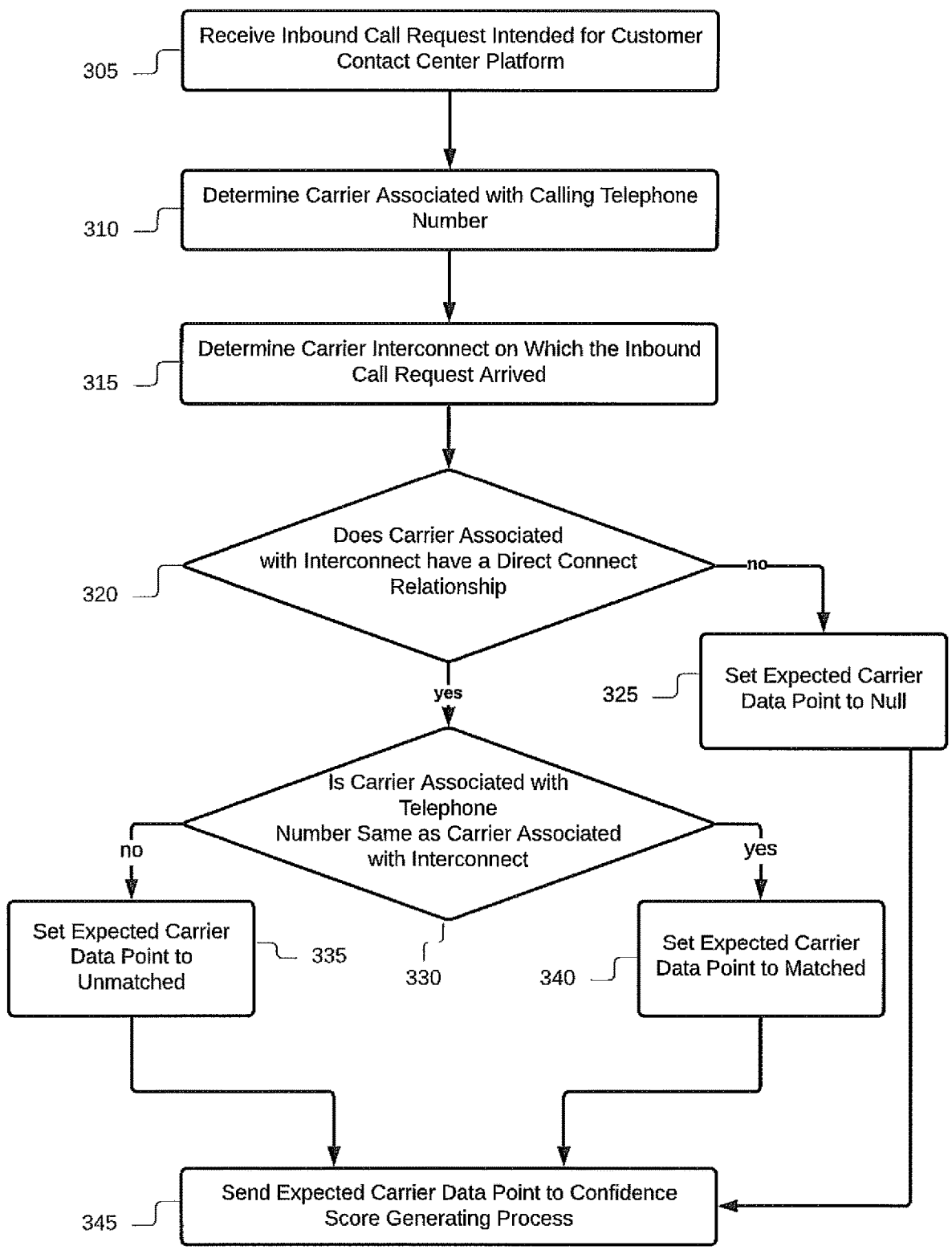
FIG. 3 illustrates a logic flow diagram describing aspects of certain embodiments disclosed herein.

Referring to FIG. 3, a first logic flow diagram 300 for determining whether the calling party telephone number for an inbound VoIP telephony call request matches the expected carrier interconnect for the received call request is shown.

Some call metadata may not be included in the call request (e.g., SIP INVITE) itself but rather can be discerned by examining how the call request got to the servicing carrier. This may be characterized as external call metadata. One particular type of external call metadata may be the identification of the carrier interconnect upon which the servicing carrier received the call request. As explained earlier, telephony carriers often have direct interconnects with other carriers to facilitate the exchange of call traffic. Identification of the carrier interconnect and therefore the carrier that handed the call to the destination servicing carrier can supplement and enhance the accuracy of confidence scoring algorithms.

In step 305 of logic flow 300, a servicing carrier may receive an inbound VoIP telephony call request. The call request may enter the servicing carrier network at one of a plurality of entry points, data centers, or other interfaces. The inbound VoIP telephony call request may be intended for a customer of the servicing telecommunications carrier network 110. More particularly, the inbound VoIP telephony call request may be intended for a contact center platform 140 of the customer. Often the telephone numbers used to reach such customer contact center platforms are toll-free telephone numbers. It may also be noted that the call request may be in the form of a SIP INVITE but may also be in other forms such as, for instance, TDM technologies or traditional ISUP trunk interconnects.

Upon receipt of the call request, intelligence within the servicing telecommunications carrier network 110 may determine the originating telephone number for the calling party as included in the call request. That telephone number may then be looked up to determine an originating carrier associated with the telephone number at step 310. Each telephone number in service is ultimately traceable back to an originating carrier that enables service for that telephone number. The originating carrier associated with the calling party telephone number in the call request is noted. Next, intelligence within the servicing telecommunications carrier network 110 may determine the carrier interconnect on which the inbound VoIP telephony call request arrived to the servicing telecommunications carrier network 110 in step 315. Based on the carrier interconnect, servicing telecommunications carrier network 110 determines whether the carrier associated with the interconnect has a direct connect relationship with the servicing telecommunications carrier network 110 at decision block 320. If there is no direct relationship, servicing telecommunications carrier network 110 may set an external call metadata type labeled, for instance, "expected carrier" to null at step 325 to indicate there is no direct connect relationship between the servicing telecommunications carrier network 110 and the carrier that handed the call request to the servicing telecommunications carrier network 110.

If there is a direct connect relationship between the servicing telecommunications carrier network 110 and the carrier that handed the call request to the servicing telecommunications carrier network 110, the intelligence within the servicing telecommunications carrier network 110 may then determine if the originating carrier associated with the telephone number of the calling party is the same as the carrier associated with the carrier interconnect (i.e., the expected carrier interconnect based on the calling party telephone number) at decision block 330.

If the expected carrier interconnect data does not match the carrier associated with the calling party telephone number, the expected carrier data point may be set to unmatched in step 335. If the expected carrier interconnect data does match the carrier associated with the calling party telephone number, the "expected carrier" label may be set to matched in step 340. This data point may then be sent, along with other call metadata, to the confidence score generating process 130 in step 345.

Figure 4:
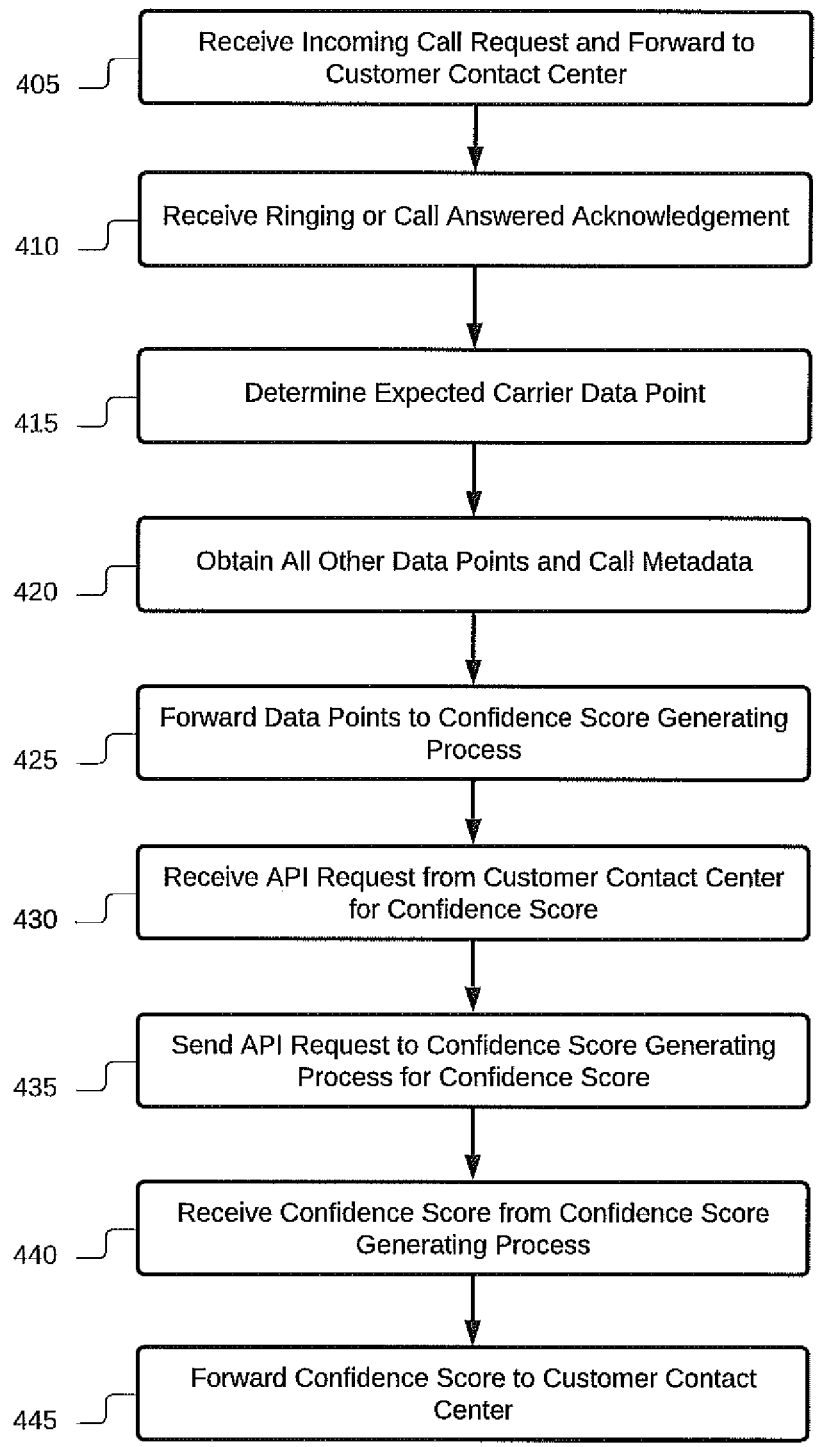
FIG. 4 illustrates a logic flow diagram describing aspects of certain embodiments disclosed herein.

Referring to FIG. 4, a logic flow diagram 400 for determining and passing a call confidence score to a telecommunications carrier network 110 customer according to an embodiment of the invention is shown. In step 405, the servicing telecommunications carrier network 110 will receive an inbound VoIP telephony call request and forward it to its intended destination of customer contact center 140. The servicing telecommunications carrier network 110 will receive a response back from the customer contact center 140 of either a call answered or call ringing message in step 410 which is relayed back to the calling party.

The expected carrier data point is then determined in step 415 using the process described in FIG. 3 above. Additional call metadata along with other call metadata data points are gathered in step 420. Examples of call metadata and external call metadata that may be used by the scoring algorithm may include, for instance, calling party telephone number, originating carrier, certain location information of the originating carrier and/or calling party device, the specific interconnect on which the SIP INVITE arrived into the servicing carrier, the data center of ingress to the servicing carrier, on-net/off-net indicators, etc.

In step 425, the call metadata and other data points are forwarded to the confidence score generating process 130 to be used to calculate a confidence score. The confidence score may be intended to provide a confidence level that the calling party is who they purport to be. The servicing telecommunications carrier network 110 may then receive an API request from the customer contact center 140 seeking the confidence score in step 430. Receipt of API request in step 430 triggers a second API request 225 from telecommunications carrier network 110 to confidence score generating process 130 also seeking the confidence score for the current call request 205 in step 435. The confidence score generating process 130 having processed the data points previously received to determine a confidence score for the current call request returns the confidence score 230 in response to API request 225 to telecommunications carrier network 110 in step 440. Telecommunications carrier network 110 in turn returns the confidence score 230 in response to API request 220 to customer contact center 140 in step 445.

In one embodiment, the passing of the confidence score to the called party occurs within the call request for the inbound VoIP telephony call. In another embodiment, the passing of the confidence score to the called party occurs outside the call request for the inbound VoIP telephony call. The entire process of obtaining the confidence score must be done such that the call request is not delayed by any significant period. In other words, the latency for the call may not exceed acceptable levels when performing the confidence score calculation.

Figure 5:
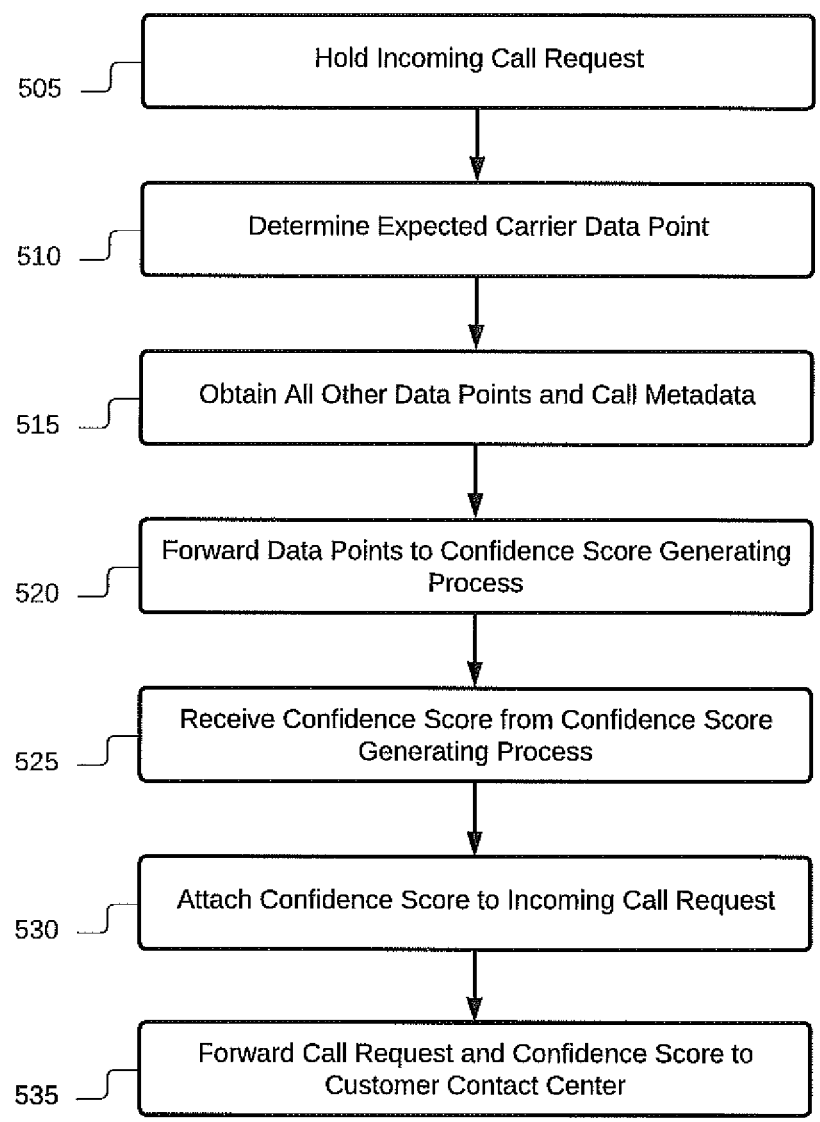
FIG. 5 illustrates a logic flow diagram describing aspects of certain embodiments disclosed herein.

Referring to FIG. 5, an alternative embodiment logic flow diagram 500 describes an alternative embodiment in which the inbound call request is held up by the telecommunications carrier network 110 prior to forwarding to customer contact center platform 140.

The telecommunications carrier network 110 receives and holds a call request at step 505 after determining the called party subscribes to the confidence score feature for inbound calls. The expected carrier data point is then determined in step 510 using the process described in FIG. 3 above. In step 515, the call metadata and other data points associated with the call request are forwarded to the confidence score generating process 130 to be used to calculate a confidence score. The servicing telecommunications carrier network 110 may then make an API request to confidence score generating process 130 seeking the confidence score. The confidence score generating process 130 having processed the data points previously received to determine a confidence score for the current call request returns the confidence score in response to the API request to telecommunications carrier network 110 in step 525. Telecommunications carrier network 110 may then embed the confidence score into the call request in step 530. Telecommunications carrier network 110 may then forward the call request including the confidence score to the customer contact center platform 140 in step 535.

Figure 6:
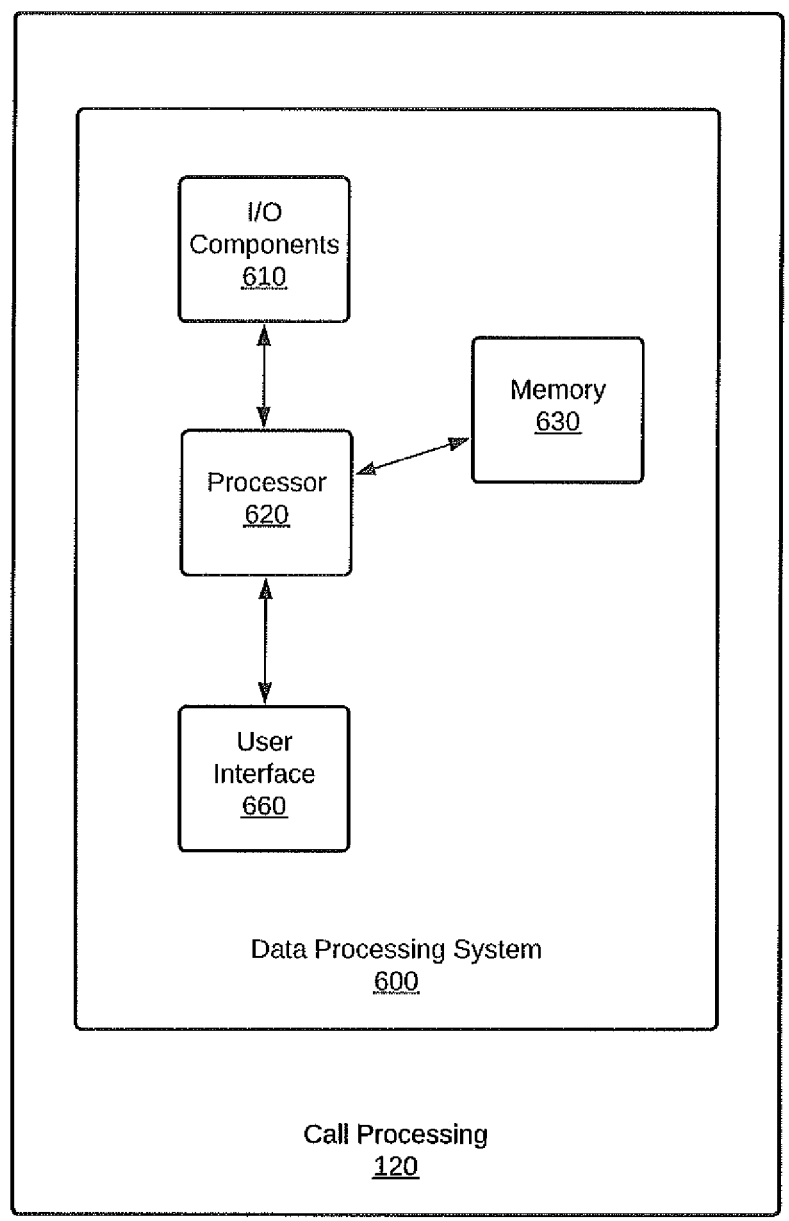
FIG. 6 illustrates intelligence within a servicing carrier for carrying out certain aspects of embodiments disclosed herein.

Referring now to FIG. 6, a block diagram of an example computer based data processing system 600 within the call processing 120 of telecommunications carrier network 110 suitable for use with any of the embodiments discussed above will be discussed. In some embodiments, the data processing system 600 can be any suitable computing device for performing operations according to the embodiments discussed herein.

As illustrated, the data processing system 600 includes a processor 620 communicatively coupled to I/O components 610, a user interface 640 and a memory 630. The processor 620 can include one or more commercially available processors, embedded processors, secure processors, microprocessors, dual microprocessors, multi-core processors, other multi-processor architectures, another suitable processing device, or any combination of these. The memory 630, which can be any suitable tangible (and non-transitory) computer-readable medium such as random access memory (RAM), read-only memory (ROM), erasable and electronically programmable read-only memory (EEPROMs), or the like, embodies program components that configure operation of the data processing system 620.

I/O components 410 may be used to facilitate wired or wireless connections to devices such as one or more displays, game controllers, keyboards, mice, joysticks, cameras, buttons, speakers, microphones and/or other hardware used to input or output data. Memory 530 represents non-volatile storages such as magnetic, optical, or other storage media included in the data processing system and/or coupled to processor 620.

The user interface 640 may include, for example, a keyboard, keypad, touchpad, voice activation circuit, display or the like and the processor 620 may execute program code or instructions stored in memory 630.

It should be appreciated that data processing system 600 may also include additional processors, additional storage, and a computer-readable medium (not shown). The processor(s) 620 may execute additional computer-executable program instructions stored in memory 630. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C #, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

In the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims may reflect, inventive subject matter may lie in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims.

The invention claimed is:

1. A method of processing an inbound voice-over internet protocol (VoIP) telephony call by a telecommunications carrier to obtain and deliver a confidence score associated with an inbound telephony call, the method comprising:
   in a telecommunications carrier network providing inbound calling services to a customer call center:
      receiving a call request for an inbound VoIP telephony call, the call request intended for the customer call center;
      obtaining a plurality of data points associated with the call request for the inbound VoIP telephony call;
      sending the plurality of data points to a confidence score generating process comprising an algorithm configured to determine a confidence score using the plurality of data points;
      receiving the confidence score from the confidence score generating process;
      receiving an application programming interface (API) call from the customer call center, the API call requesting the confidence score; and
      passing the confidence score to the customer call center as a result of the API call.

2. The method of claim 1, wherein the data points include call metadata associated with the inbound VoIP telephony call, wherein the call metadata is extracted from the call request for the inbound VoIP telephony call.

3. The method of claim 2, wherein at least one of the plurality of data points is an interconnect carrier identifier, the interconnect carrier identifier data point identifying an upstream carrier that handed the inbound VoIP telephony call to the telecommunications carrier network.

4. The method of claim 3, wherein at least one of the plurality of data points indicates an originating carrier for the inbound VoIP telephony call as determined from the call metadata.

5. The method of claim 4, further comprising:
   determining whether the originating carrier and the telecommunications carrier network have a direct interconnect relationship such that inbound VoIP telephony calls from the originating carrier are handed directly to the telecommunications carrier network; and
   setting an expected carrier data point to unmatched when there is a direct interconnect relationship between the originating carrier and the telecommunications carrier network and the originating carrier and interconnect carrier are not the same.

6. The method of claim 1, wherein at least one of the data points indicates an on-net status of the call request with respect to the telecommunications carrier network, wherein the on-net status further includes anonymized data indicating a customer associated with an on-net call.

7. The method of claim 1, wherein the call request for the inbound VoIP telephony call is a session initiation protocol (SIP) INVITE message.

8. The computer system of claim 7, wherein at least one of the data points indicates an on-net status of the call request with respect to the telecommunications carrier network, wherein the on-net status further includes anonymized data indicating a customer associated with an on-net call.

9. The computer system of claim 7, wherein the call request for the inbound VoIP telephony call is a session initiation protocol (SIP) INVITE message.

10. A computer system in a telecommunications carrier network for processing an inbound VoIP telephony call, the computer system comprising:
  one or more memories;
  one or more processors, communicatively coupled to the one or more memories, the one or more processors configured to:
    receive a call request for an inbound VoIP telephony call, the call request intended for a customer call center;
    obtain a plurality of data points associated with the call request for the inbound VoIP telephony call;
    send the plurality of data points to a confidence score generating process comprising an algorithm configured to determine a confidence score using the plurality of data points;
    receive the confidence score from the confidence score generating process;
    receive an application programming interface (API) call from the customer call center, the API call requesting the confidence score; and
    pass the confidence score to the customer call center as a result of the API call.

11. The computer system of claim 10, wherein the data points include call metadata associated with the inbound VoIP telephony call, wherein the call metadata is extracted from the call request for the inbound VoIP telephony call.

12. The computer system of claim 11, wherein at least one of the plurality of data points is an interconnect carrier identifier, the interconnect carrier identifier data point identifying an upstream carrier that handed the inbound VoIP telephony call to the telecommunications carrier network.

13. The computer system of claim 12, wherein at least one of the plurality of data points indicates an originating carrier for the inbound VoIP telephony call as determined from the call metadata.

14. The computer system of claim 13, wherein the one or more processors are further configured to:
  determining whether the originating carrier and the telecommunications carrier network have a direct interconnect relationship such that inbound VoIP telephony calls from the originating carrier are handed directly to the telecommunications carrier network; and
  setting an expected carrier data point to unmatched when there is a direct interconnect relationship between the originating carrier and the telecommunications carrier network and the originating carrier and interconnect carrier are not the same.

15. At least one non-transitory machine-readable medium comprising a set of instructions executable on at least one telecommunications carrier network computing device to cause at least one processor to process an inbound VoIP telephony call, the set of instructions to:
  receive a call request for an inbound VoIP telephony call, the call request intended for a customer call center;
  obtain a plurality of data points associated with the call request for the inbound VoIP telephony call;
  send the plurality of data points to a confidence score generating process comprising an algorithm configured to determine a confidence score using the plurality of data points;
  receive the confidence score from the confidence score generating process;
  receive an application programming interface (API) call from the customer call center, the API call requesting the confidence score; and
  pass the confidence score to the customer call center as a result of the API call.

16. The at least one non-transitory machine-readable medium of claim 15, wherein the data points include call metadata associated with the inbound VoIP telephony call, wherein the call metadata is extracted from the call request for the inbound VoIP telephony call.

17. The at least one non-transitory machine-readable medium of claim 16, wherein at least one of the plurality of data points is an interconnect carrier identifier, the interconnect carrier identifier data point identifying an upstream carrier that handed the inbound VoIP telephony call to the telecommunications carrier network.

18. The at least one non-transitory machine-readable medium of claim 17, wherein at least one of the plurality of data points indicates an originating carrier for the inbound VoIP telephony call as determined from the call metadata.

19. The at least one non-transitory machine-readable medium of claim 18, wherein the set of instructions further cause the at least one processor to:
  determining whether the originating carrier and the telecommunications carrier network have a direct interconnect relationship such that inbound VoIP telephony calls from the originating carrier are handed directly to the telecommunications carrier network; and
  setting an expected carrier data point to unmatched when there is a direct interconnect relationship between the originating carrier and the telecommunications carrier network and the originating carrier and interconnect carrier are not the same.

20. The at least one non-transitory machine-readable medium of claim 15, wherein at least one of the data points indicates an on-net status of the call request with respect to the telecommunications carrier network, wherein the on-net status further includes anonymized data indicating a customer associated with an on-net call.

21. The at least one non-transitory machine-readable medium of claim 15, wherein the call request for the inbound VoIP telephony call is a session initiation protocol (SIP) INVITE message.

22. A method of processing an inbound voice-over internet protocol (VoIP) telephony call by a telecommunications carrier to obtain and deliver a confidence score associated with an inbound telephony call, the method comprising:
  in a telecommunications carrier network providing inbound calling services to a customer call center:
    receiving a call request for an inbound VoIP telephony call, the call request intended for the customer call center;
    obtaining a plurality of data points associated with the call request for the inbound VoIP telephony call;
    sending the plurality of data points to a confidence score generating process comprising an algorithm configured to determine a confidence score using the plurality of data points;

receiving the confidence score from the confidence score generating process;

embedding the confidence score into the call request; and passing the call request for the inbound VoIP telephony call to the customer call center.

23. The method of claim 22, wherein the data points include call metadata associated with the inbound VoIP telephony call, wherein the call metadata is extracted from the call request for the inbound VoIP telephony call.

24. The method of claim 23, wherein at least one of the plurality of data points is an interconnect carrier identifier, the interconnect carrier identifier data point identifying an upstream carrier that handed the inbound VoIP telephony call to the telecommunications carrier network.

25. The method of claim 24, wherein at least one of the plurality of data points indicates an originating carrier for the inbound VoIP telephony call as determined from the call metadata.

26. The method of claim 25, further comprising:

determining whether the originating carrier and the telecommunications carrier network have a direct interconnect relationship such that inbound VoIP telephony calls from the originating carrier are handed directly to the telecommunications carrier network; and setting an expected carrier data point to unmatched when there is a direct interconnect relationship between the originating carrier and the telecommunications carrier network and the originating carrier and interconnect carrier are not the same.

27. The method of claim 22, wherein at least one of the data points indicates an on-net status of the call request with respect to the telecommunications carrier network, wherein the on-net status further includes anonymized data indicating a customer associated with an on-net call.

28. The method of claim 22, wherein the call request for the inbound VoIP telephony call is a session initiation protocol (SIP) INVITE message.

* * * * *